US011353101B2

(12) United States Patent
Li

(10) Patent No.: US 11,353,101 B2
(45) Date of Patent: Jun. 7, 2022

(54) METHODS AND SYSTEMS FOR PRODUCING HIGH STRENGTH AND ADJUSTABLE STIFFNESS COMPONENTS

(71) Applicant: GM GLOBAL TECHNOLOGY OPERATIONS LLC, Detroit, MI (US)

(72) Inventor: Huaxin Li, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 285 days.

(21) Appl. No.: 16/441,816

(22) Filed: Jun. 14, 2019

(65) Prior Publication Data
US 2020/0393031 A1 Dec. 17, 2020

(51) Int. Cl.
*F16H 55/06* (2006.01)
*F16H 55/17* (2006.01)
*B29D 15/00* (2006.01)
*C04B 41/90* (2006.01)
*B29L 15/00* (2006.01)

(52) U.S. Cl.
CPC .............. *F16H 55/06* (2013.01); *B29D 15/00* (2013.01); *C04B 41/90* (2013.01); *F16H 55/17* (2013.01); *B29L 2015/003* (2013.01)

(58) Field of Classification Search
CPC ......... F16H 55/06; F16H 55/17; B29D 15/00; C04B 41/90; B29L 2015/003
See application file for complete search history.

(56) References Cited

U.S. PATENT DOCUMENTS

| 4,458,547 A | * | 7/1984 | Fina | F16H 55/06 264/257 |
| 2004/0048711 A1 | * | 3/2004 | Lev | F16H 57/0482 475/159 |
| 2017/0261087 A1 | * | 9/2017 | White | B23K 15/0086 |
| 2017/0284914 A1 | * | 10/2017 | Johnson | G01M 13/022 |

* cited by examiner

*Primary Examiner* — Victor L MacArthur
*Assistant Examiner* — Gregory T Prather
(74) *Attorney, Agent, or Firm* — Quinn IP Law

(57) ABSTRACT

A method for producing and reinforcing a composite gear includes providing a base material comprising a polymer and forming a composite gear from the base material, the composite gear having a gear body and at least one gear tooth extending from the gear body, the at least one gear tooth having a tooth face, a tooth flank, a tooth fillet, a tooth root, and a tooth tip. The method includes depositing a first metallic material to a first area of the at least one gear tooth of the composite gear, the first area including the tooth root of the at least one gear tooth and depositing a second metallic material to a second area of the at least one gear tooth of the composite gear. The first metallic material is applied in a first thickness and the second metallic material is applied in a second thickness.

11 Claims, 2 Drawing Sheets

METHODS AND SYSTEMS FOR PRODUCING HIGH STRENGTH AND ADJUSTABLE STIFFNESS COMPONENTS

INTRODUCTION

The present disclosure relates generally to the manufacture of high strength and adjustable stiffness plastic components.

For metal components, bending fatigue strength may be enhanced by locally shot-peening the component. This shot-peened layer can significantly increase the component's resistance to crack initiation under bending stresses. However, plastic components such as gears, may have low bend fatigue strength, low stiffness due to the low Young's modulus of the material, and low wear resistance, without an equivalent method of enhancing the strength of the component.

SUMMARY

Embodiments according to the present disclosure provide a number of advantages. For example, embodiments according to the present disclosure enable production of high performance plastic components, such as gears, having high bending fatigue strength and adjustable tooth stiffness by locally plating high strength and high stiffness metal coating on the component where needed. In various embodiments, tooth bending fatigue strength is enhanced by plating high strength metals such as, for example and without limitation, copper, nickel, or other nano metals at the root area of the gear. Tooth stiffness and wear resistance may be optimized by controlling the height of the plating relative to the tooth root and the shape of the applied plating.

In an exemplary embodiment of the present disclosure, a method for producing and reinforcing a composite part includes the steps of providing a base material and forming a composite part from the base material, the composite part having a first area determined from a desired fatigue bending strength of the composite part and a second area determined from a desired stiffness of the composite part. The method also includes depositing a first material to the first area of the composite part and depositing a second material to the second area of the composite part. The first material is applied in a first thickness and the second material is applied in a second thickness.

In various aspects, the base material is a polymer.

In various aspects, the composite part is a gear comprising one or more gear teeth, each gear tooth having a tooth face, a tooth flank, a tooth fillet, a tooth root, and a tooth tip.

In various aspects, the first material is a metallic material and the first area includes at least part of the tooth root and the tooth fillet.

In various aspects, the second material is a metallic material different from the first material and the second area includes at least part of the tooth root and the tooth fillet.

In various aspects, the first area and the second area at least partially overlap.

In various aspects, the first material is applied in a first shape and the second material is applied in a second shape different from the first shape.

In various aspects, the second thickness is different from the first thickness.

In various aspects, the first area has a first height measured from the tooth root and the second area has a second height measured from the tooth root, and the first height is different from the second height.

In an exemplary embodiment of the present disclosure a composite gear includes a base material forming a gear body and at least one gear tooth extending from the gear body, the gear tooth having a tooth face, a tooth flank, a tooth fillet, a tooth root, and a tooth tip. A first material covers a first area of the gear tooth, the first area including the tooth root and a second material covers a second area of the gear tooth, the second area including the tooth root. The first material is applied in a first thickness, the second material is applied in a second thickness, the first area has a first height measured from the tooth root and the second area has a second height measured from the tooth root, and the first height is different from the second height.

In various aspects, each of the first material and the second material is a metallic material.

In various aspects, the first area of the gear tooth is determined from a desired fatigue bending strength of the gear tooth.

In various aspects, the second area of the gear tooth is determined from a desired stiffness of the gear tooth.

In various aspects, the first material and the second material are the same material.

In an exemplary embodiment of the present disclosure, a method for producing and reinforcing a composite gear includes providing a base material comprising a polymer and forming a composite gear from the base material, the composite gearing having a gear body and at least one gear tooth extending from the gear body, the at least one gear tooth having a tooth face, a tooth flank, a tooth fillet, a tooth root, and a tooth tip. The method also includes depositing a first metallic material to a first area of the at least one gear tooth of the composite gear, the first area including the tooth root of the at least one gear tooth and depositing a second metallic material to a second area of the at least one gear tooth of the composite gear. The first metallic material is applied in a first thickness and the second metallic material is applied in a second thickness.

In various aspects, the first area and the second area at least partially overlap.

In various aspects, the first metallic material is applied to the tooth root of the at least one gear tooth and the second metallic material is applied to the tooth fillet of the at least one gear tooth.

In various aspects, the first area has a first height measured from the tooth root and the second area has a second height measured from the tooth root, and the first height is different from the second height.

In various aspects, the first area is determined from a desired fatigue bending strength of the at least one gear tooth and the second area is determined from a desired stiffness of the at least one gear tooth.

In various aspects, the first material is a different from the second material.

BRIEF DESCRIPTION OF THE DRAWINGS

The present disclosure will be described in conjunction with the following figures, wherein like numerals denote like elements.

Figure 1:
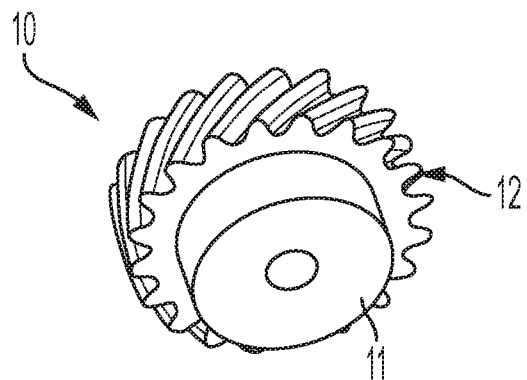
FIG. 1 is a perspective side view of a gear, according to an embodiment of the disclosure.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The present disclosure includes a process and product produced using the process which overcomes the limitations of previous approaches and is suitable for producing a product having an improved strength and adjustable stiffness having reinforced material optimally deposited in areas of the product subject to fatigue.

Figure 2:
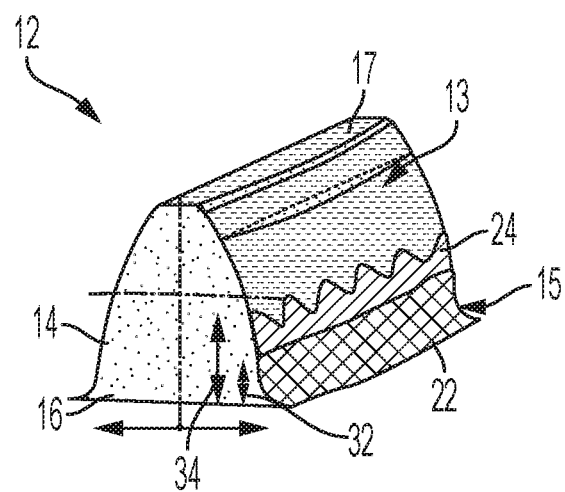
FIG. 2 is a schematic perspective side view of a tooth of the gear of FIG. 1, according to an embodiment of the disclosure.

FIG. 1 illustrates a product, specifically a gear 10 having a gear body 11 and a plurality of gear teeth 12 extending from the gear body 11. In various embodiments, the gear 10 is made from a base material such as a plastic or other polymer material in a molding process, 3D printing process, additive manufacturing process, or other process known to those skilled in the art. FIG. 2 illustrates one gear tooth 12 of the gear 10 formed using the reinforcement process discussed herein.

With reference to FIG. 2, the gear tooth 12 includes a tooth face 13 having a first side and as second side opposite the first side. Each side of the tooth face 13 includes a tooth flank 14 and a tooth fillet 15 extending from a tooth root 16. A tooth tip surface 17 connects both sides of the tooth face 13.

In various embodiments, when the gear tooth 12 is formed from a plastic or other polymer material, the gear tooth 12 may have poor bending fatigue strength at the tooth root 16. To improve the resilience of the gear tooth 12, one or more layers of one or more high strength materials is added to localized areas of the gear tooth 12. For example, to improve fatigue strength of the gear tooth 12, one or more layers of material is applied at the tooth root. In another example, to improve stiffness of the gear tooth 12, one more of layers of material are applied higher up the tooth, as measured from the tooth root.

As shown in FIG. 2, a first material 22 is applied to the tooth flank 14 and tooth fillet 15. In some embodiments, a second material 24 is applied atop of and/or in contact with the first material 22. In some embodiments, the first material 22 is applied to a first area of the tooth flank 14 and/or the tooth fillet 15 and the second material 24 is applied to a second area of the tooth flank 14 and/or the tooth fillet 15. In various embodiments, the first area is adjacent to the second area. In various embodiments, the first area is proximate to but not in contact with the second area. In various embodiments, the first area and the second area at least partially overlap to increase the stiffness of the gear tooth and improve the fatigue bending strength of the gear tooth. In various embodiments, the first area is determined from a desired fatigue bending strength of the gear tooth. In various embodiments, the second area is determined from a desired stiffness of the gear tooth.

The materials 22, 24 may be one or more of a high strength metallic material such as, for example and without limitation, copper, nickel, or a nano metal. In various embodiments, the material 22 is a first material and the material 24 is a second material that is different from the first material. In various embodiments, the first material 22 is the same as the second material 24.

In various embodiments, the first material 22 and/or the second material 24 are applied via plating or other material depositing techniques. A height 32 of the first material 22 can be optimized depending on desired physical characteristics of the gear tooth, such as tooth bending fatigue strength. A height 34 of the second material 24 can be similarly optimized depending on the desired physical characteristics and performance of the final product, such as tooth bending fatigue strength and/or stiffness. In various embodiments, the heights 32, 34 are measured from the tooth root 16 and each material 22, 24 extends upward along the tooth face 13. The heights 32, 34 depend on various characteristics of the gear tooth 12, including, for example and without limitation, the height of the gear tooth 12, the gear macro geometry which includes whole depth, pressure angle module, tooth thickness, the desired strength and wear resistance including the desired gear tooth strength, the desired stiffness of the part, etc.

In various embodiments, an applied thickness of the materials 22, 24 varies throughout the heights 32, 34. In various embodiments, the thickness of the materials 22, 24 is greatest near the tooth root 16. In various embodiments, a shape of the first and second materials 22, 24 as applied to the gear tooth 12 is also varied depending on the desired physical characteristics of the product. In some embodiments, as shown in FIG. 2, the first material 22 is applied having a first shape having a substantially straight edge and the second material 24 is applied having a second shape having a wave edge. In some embodiments, to improve gear tooth bending fatigue resistance, the thickness of one or more of the materials 22, 24 is greater at the tooth root 16. In various embodiments, the thickness of one or more of the materials 22, 24 varies along the height of the tooth from the tooth root 16 to the tooth tip surface 17 such that the thickness of the one or more materials 22, 24 is greater at the tooth root 16 than at the tooth tip surface 17. In various embodiments, one or more of the materials 22, 24 is applied only partially up the tooth face 13 such that the first material 22 is applied in a first thickness over a first area of the tooth face 13 and the second material is applied in a second thickness over a second area of the tooth face 13. In some embodiments, the first and second areas overlap. In some embodiments, the first and second areas do not overlap and are adjacent. In some embodiments, the first thickness is greater than the second thickness. In some embodiments, the second thickness is greater than the first thickness. In some embodiments, the first and second thickness are substantially equal.

Figure 3:
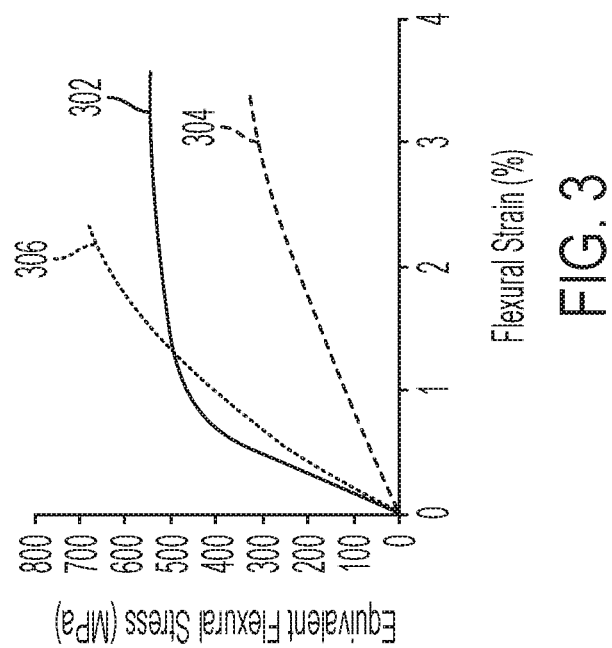
FIG. 3 is a graphical illustration of the stress and strain responses of a reinforced and unreinforced product, according to an embodiment.

With reference to FIG. 3, the improved strength of a product reinforced using the methods and materials discussed herein is graphically illustrated. A product, such as the gear tooth 12 of the gear 10, made from a polymer material, performs as indicated by line 304 in a bending test. In contrast, a product reinforced with a metallic coating such as those discussed herein performs as indicated by line 302. Additionally, a product reinforced with a nano material, as discussed herein, performs as indicated by line 306. The response to the flexural stress of both of the reinforced products exceeds the performance of the non-reinforced product.

Figure 4:
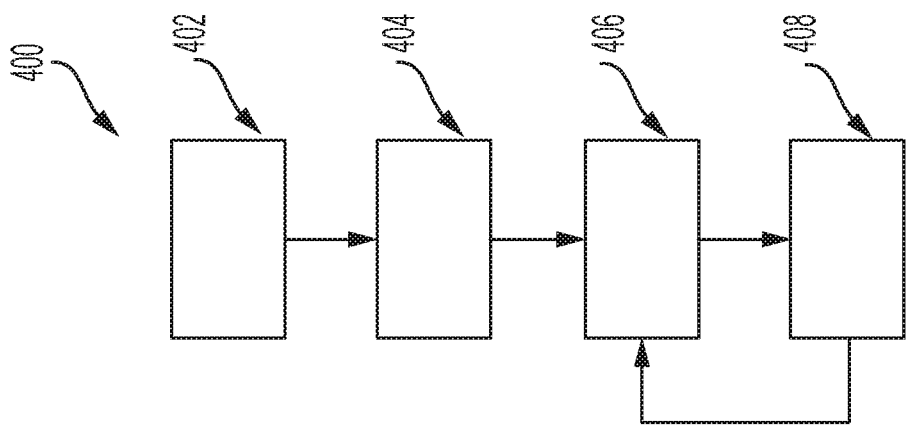
FIG. 4 is a flowchart representation of a method of manufacture of a product, such as the gear of FIG. 1, according to an embodiment of disclosure.

FIG. 4 illustrates a method 400 for reinforcing a product in flowchart form. The method 400 may be used to generate and reinforce the gear tooth 12 of the gear 10 but may also be used to reinforce other products for which increased strength and adjustable stiffness is desired, for example and without limitation. The order of operation of the method 400 is not limited to the sequential execution as illustrated in FIG. 4, but may be performed in one or more varying orders, or steps may be performed simultaneously, as applicable in accordance with the present disclosure.

Starting at 402, one or more materials are selected to form the base product or component. In various embodiments, the base material is a plastic or other polymer material.

Next, at 404, the product is molded or otherwise formed using the base material. In some embodiments, the product is a gear formed using precision molding, 3D printing, additive manufacturing, or other method known to those skilled in the art.

At 406, the first material is plated or otherwise deposited on the base product. In various embodiments, the first material is a metallic or other high strength material, as discussed herein. In various embodiments, the first material is applied to the base product in a first area in which higher fatigue strength is desired, such as at a tooth fillet or root, as shown in FIG. 2.

Next, at 408, the second material is plated or otherwise deposited on the base product. In various embodiments, the second material is a metallic or other high strength material, as discussed herein, and may be the same material or a different material from the first material. In various embodiments, the second material is applied to the base product in an area in which higher fatigue strength, stiffness, and wear resistance is desired, such as at the tooth fillet or root and/or extending from the tooth fillet along the tooth face areas, as shown in FIG. 2.

Depending on the desired physical characteristic, the first and second materials may be applied to different areas of the base product or to the same area of the base product. Additionally, the coverage shape or area of each of the first and second materials may vary depending on the base product and the desired performance characteristic, such as strength, stiffness, flexibility, wear resistance, etc., for example and without limitation. Also, the thickness of each of the first and second materials can vary, both from each other and throughout the area of coverage, depending on the desired performance characteristic.

From 408, the method 400 can optionally return to step 406 and additional materials may be plated or otherwise deposited on the product. If additional layers of reinforcing materials are not desired, the method 400 ends.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A composite gear, comprising:
   a base material forming a gear body and at least one gear tooth extending from the gear body, the gear tooth having a tooth face, a tooth flank, a tooth fillet, a tooth root, and a tooth tip;
   a first material covering a first area of the gear tooth, the first area including the tooth root; and
   a second material covering a second area of the gear tooth, the second area including the tooth root;
   wherein at least a portion of the second material does not overlap with the first material;
   wherein the first material defines a first shape having a substantially straight edge on the gear tooth and the second material defines a second shape having a wavy edge on the gear tooth; and
   wherein the first material is applied in a first thickness, the second material is applied in a second thickness, the first area has a first height measured from the tooth root and the second area has a second height measured from the tooth root, and the first height is different from the second height.

2. The composite gear of claim 1, wherein each of the first material and the second material is a metallic material.

3. The composite gear of claim 1, wherein the first area of the gear tooth is determined from a desired fatigue bending strength of the gear tooth.

4. The composite gear of claim 1, wherein the second area of the gear tooth is determined from a desired stiffness of the gear tooth.

5. The composite gear of claim 1, wherein the first material and the second material are the same material.

6. A method for producing and reinforcing a composite gear, comprising:
   providing a base material comprising a polymer;
   forming a composite gear from the base material, the composite gear having a gear body and at least one gear tooth extending from the gear body, the at least one gear tooth having a tooth face, a tooth flank, a tooth fillet, a tooth root, and a tooth tip;
   depositing a first metallic material to a first area of the at least one gear tooth of the composite gear, the first area including the tooth root of the at least one gear tooth; and
   depositing a second metallic material to a second area of the at least one gear tooth of the composite gear such that at least a portion of the second metallic material does not overlap with the first metallic material;
   wherein the first metallic material defines a first shape having a substantially straight edge on the gear tooth and the second metallic material defines a second shape having a wavy edge on the gear tooth; and
   wherein the first metallic material is applied in a first thickness and the second metallic material is applied in a second thickness.

7. The method of claim 6, wherein the first area and the second area at least partially overlap.

8. The method of claim 6, wherein the first metallic material is applied to the tooth root of the at least one gear tooth and the second metallic material is applied to the tooth fillet of the at least one gear tooth.

9. The method of claim 6, wherein the first area has a first height measured from the tooth root and the second area has a second height measured from the tooth root, and the first height is different from the second height.

10. The method of claim 6, wherein the first area is determined from a desired fatigue bending strength of the at least one gear tooth and the second area is determined from a desired stiffness of the at least one gear tooth.

11. The method of claim 6, wherein the first metallic material is a different from the second metallic material.

* * * * *